United States Patent [19]
Guativa et al.

[11] Patent Number: 5,487,311
[45] Date of Patent: Jan. 30, 1996

[54] AIR VELOCITY AVERAGING ROTOR

[75] Inventors: Alfonso C. Guativa, Champaign; David M. Schwenk, Urbana, both of Ill.; James P. Miller, Zama, Japan

[73] Assignee: The United States of America as represented by the Secretary of the Army, Washington, D.C.

[21] Appl. No.: 416,554

[22] Filed: Apr. 4, 1995

[51] Int. Cl.⁶ ..................................................... G01F 15/00
[52] U.S. Cl. ..................... 73/861.77; 73/861.79
[58] Field of Search ................. 73/170.15, 185, 73/187, 861.77, 861.78, 861.79, 861.87, 861.88, 861.92, 861.93, 861.94, 861.35

[56] References Cited

U.S. PATENT DOCUMENTS

| | | | |
|---|---|---|---|
| 4,248,082 | 2/1981 | Farmer | 73/861.78 X |
| 4,324,144 | 4/1982 | Miyata et al. | 73/861.77 |
| 4,404,861 | 9/1983 | Wass | 73/861.79 X |
| 4,438,648 | 3/1984 | Cheney, Jr. | 73/861.35 X |
| 4,449,664 | 5/1984 | Mithuhira et al. | 73/861.78 X |
| 4,674,338 | 6/1987 | Carpenter | 73/861.77 |
| 5,038,607 | 8/1991 | Baer et al. | 73/861.78 X |
| 5,337,615 | 8/1994 | Goss | 73/861.77 X |

*Primary Examiner*—Richard Chilcot
*Assistant Examiner*—Elizabeth L. Dougherty
*Attorney, Agent, or Firm*—Luther A. Marsh

[57] ABSTRACT

A device for measuring air flow in a conduit is characterized by a flow directing shroud mounted within the conduit and having inlet and outlet portions defining a circular opening through which the air flow is directed. A turbine-type anemometer is positioned within the circular opening such that substantially all air flow within the conduit is directed through the turbine blades, thereby enabling the average flow velocity in the conduit to be determined with a single measurement.

13 Claims, 2 Drawing Sheets

AIR VELOCITY AVERAGING ROTOR

BACKGROUND OF THE INVENTION

The present invention relates to a device for measuring the fluid flow rate in a conduit and, in particular, to a turbine-type flow meter for accurately measuring the air flow rate in the duct work of a heating, ventilating and air conditioning (HVAC) system.

The fluid flow velocity profile in a conduit is not uniform with velocity being greatest at the center of the conduit and theoretically zero at the conduit walls. When using velocity to measure flow rate, consideration must be given to the velocity distribution across the conduit. Therefore, devices providing only single point measurement cannot accurately measure the flow rate through a conduit.

One commonly used single point measurement device is the hot wire anemometer which uses an electrically heated wire placed in the fluid flow stream to measure flow velocity as a function of the rate of heat transfer between the wire and the fluid. Another single point measurement device is the pitot tube which measures the difference between the total and static pressure of the flow which can be used to calculate velocity. The obstruction meter is a third type of single point measurement device. Common forms of obstruction meters are the venturi, the flow nozzle and the orifice. With each of these obstruction meters, the basic meter restricts the path of the flowing fluid causing changes in velocity and concurrent changes in pressure. Velocity can be calculated from pressure measurements made at the location of the restriction and at a point upstream therefrom.

To determine the aveage flow velocity within a conduit using single point measurement technology, an array consisting of many point sensors proportional spaced throughout the flow channel must be used. Due to the large number of sensors often required, these technologies become expensive. Another disadvantage of these technologies is that the sensors generate analog signals which must be converted to a digital format to be used by state-of-the-art digital controllers. An additional drawback of these technologies is that they require a length of at least eight diameters of unobstructed flow upstream from the array to obtain an accurate air flow velocity measurement.

Another flow measurement technique uses ultrasonic waves transmitted across the conduit to measure flow velocity. A transmitter which emits sound waves and a receiver are used to measure the speed of the sound waves which travel at different speeds depending on the fluid flow rate. This technique requires somewhat complex electronic circuitry to produce the sound pulse, to transmit and receive that pulse, and finally to measure the amount of time it takes that pulse to travel across the conduit. Furthermore, since the transducer output is an analog signal, this signal must be converted to a digital signal for use by a digital controller.

A forth flow measuring device is the turbine flow meter. This device uses eight or more blades radiating out from a shaft arranged parallel to the air flow which causes the device to spin (similar to a propeller). A magnetic pick-up or similar means counts the pulses and an air flow measurement is calculated based on the pulses detected by the pick-up. This device is generally no larger than 10 inches in diameter and provides essentially a single point measurement. Typically the turbine flow meter is used only for spot measurements and is removed from the duct after measurements are completed.

BRIEF DESCRIPTION OF THE PRIOR ART

Devices for creating pressure differences which can be used to measure the corresponding rate of flow in a conduit are well known. The Dodge U.S. Pat. No. 1,298,471, for example, discloses a pressure difference creating apparatus of the flow nozzle type includes a device which extends across the conduit and has an opening of lesser diameter than the conduit. This device is intended for use in a flow meter in which the pressure difference between the leading and trailing pipe sections is used to calculate flow velocity.

The Komons U.S. Pat. No. 4,581,930 discloses a thermal anemometer including an array of thermistor sensors arranged throughout the duct for measuring the average mass flow rate of a gas in a duct where the fluid velocity varies substantially throughout a transverse plane of the duct.

The Stover U.S. Pat. No. 3,298,230 discloses a vein-type flow meter for measuring flow in a circular pipe which takes into account the variation of velocity across the pipe and is unaffected by upstream pipe conditions such as elbows, tees, or partially closed valves.

The Rudow et al U.S. Pat. No. 3,823,611 discloses a portable anemometer designed to accurately measure low gas velocities in confined spaces, such as ducts, or in open spaces.

The present invention was developed to overcome the drawbacks of current flow measurement devices and techniques by providing a flow measurement device including a flow directing shroud mounted in a conduit and having a circular opening within which a turbine-type anemometer is positioned.

SUMMARY OF THE INVENTION

Accordingly, it is a primary object of the present invention to provide an improved air velocity measurement device including a flow directing shroud having a restrictive center opening adapted for mounting within a conduit having air flowing therethrough. A turbine-type anemometer having a shaft, a rotor hub, and radially extending blades is positioned in the center of the shroud so that substantially all of the air passes through the anemometer. The rate of rotation of the anemometer is converted into a velocity signal corresponding to the average flow velocity in the conduit.

It is a further object of the present invention to provide a turbine-type anemometer which accurately measures the average flow velocity in a conduit in which the air flow velocity varies across the plane of the duct.

A yet further object of the present invention is to provide a turbine-type anemometer which can accurately measure the air flow velocity in a conduit regardless of the length of the unobstructed conduit upstream from the device.

Another object of the present invention is to provide a turbine-type anemometer which outputs measurement data in digital form using a pulse counter, thereby eliminating the need for analog to digital conversion.

Another object of the present invention is to provide a turbine-type anemometer creating a minimum pressure drop.

BRIEF DESCRIPTION OF THE FIGURES

Other objects and advantages of the invention will become apparent from a study of the following specification when viewed in light of the accompanying drawing, in which.

DETAILED DESCRIPTION

Figure 1:
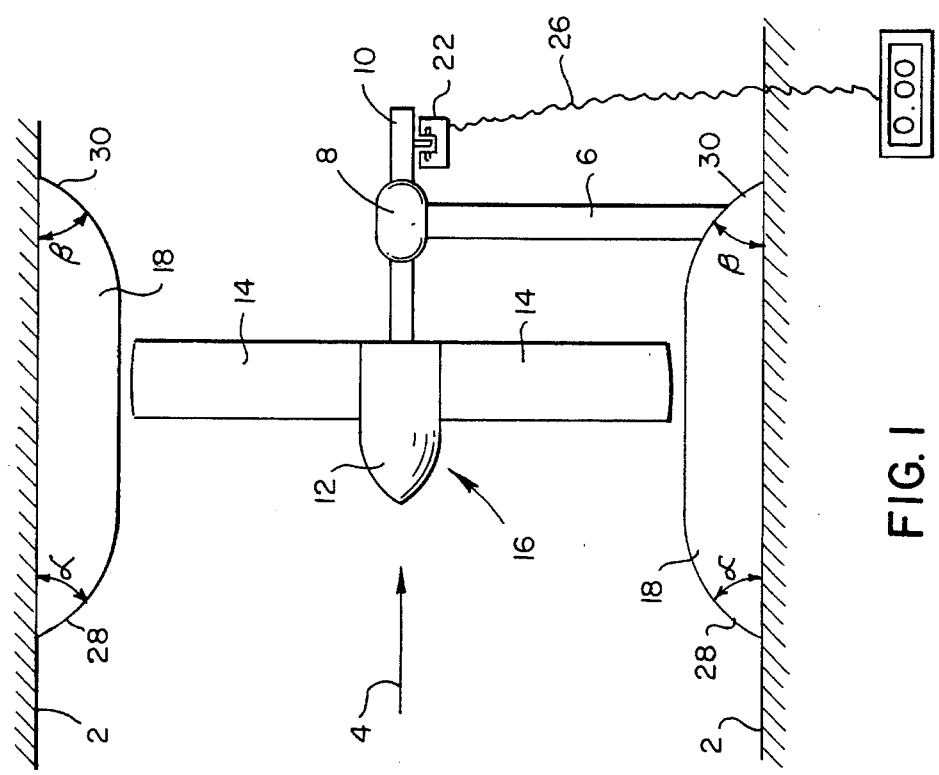
FIG. 1 is a side perspective view of the present invention mounted in a duct shown in cross-section.

Referring first to FIG. 1, there is shown a duct 2 having an air flow 4 whose velocity is to be measured. The velocity measuring device includes a support member 6 mounted on an inner wall of the duct and extending to the center thereof, from the top and bottom of the duct. A housing 8 through which a rotor shaft 10 passes is mounted on the end of the support member 6 and allows the shaft to rotate about its longitudinal axis. The rotor shaft 10 is mounted so as to be substantially parallel to the air flow direction 4. Mounted on the shaft is a rotor hub 12 from which the rotor blades 14 extend radially outward. In accordance with the characterizing feature of the invention, the rotor shaft 10, rotor hub 12 and rotor blades 14 comprise a rotor assembly 16 of a turbine which is centrally positioned within a flow directing shroud 18 which directs all air flowing within the duct past the rotor assembly through a central opening 20 shown in FIG. 2. By so directing the air flow, account is made for the non-uniform velocity distribution across the duct and the average air flow velocity is determined using a single measurement. Moreover, the shroud 18 creates an even flow effect across the rotor assembly 16, thereby eliminating the requirement for a given length of unobstructed duct upstream to obtain an accurate measurement.

The rate of rotation of the rotor assembly 16, which is proportional to the air flow velocity, is sensed by a pulse counter 22 such as a magnetic pick-up or an optical sensor. The pulse counter is mounted so as to detect rotation of the rotor shaft 10 or, alternatively, may be mounted within the shroud 18 to detect the rotation of the rotor blades 14. A controller display unit 24 is connected to the pulse counter 22 by a wire 26. The controller converts the rate of rotation detected by the pulse counter into a measurement corresponding to the average flow velocity in the duct.

The pressure drop across the shroud 18 is minimized by maintaining an angle of inclination α between the leading edge of the front portion 28 of the shroud and the duct wall 2 of no more than 21° and an angle of inclination β between the trailing edge of the outlet portion 30 of the shroud of no more than 15°. To minimize the pressure drop across the rotor assembly 16, the rotor blades 12 are designed with a pitch angle of 45° and are constructed using a state-of-the-art composite material such as carbon fibers or fiberglass.

Figure 2:
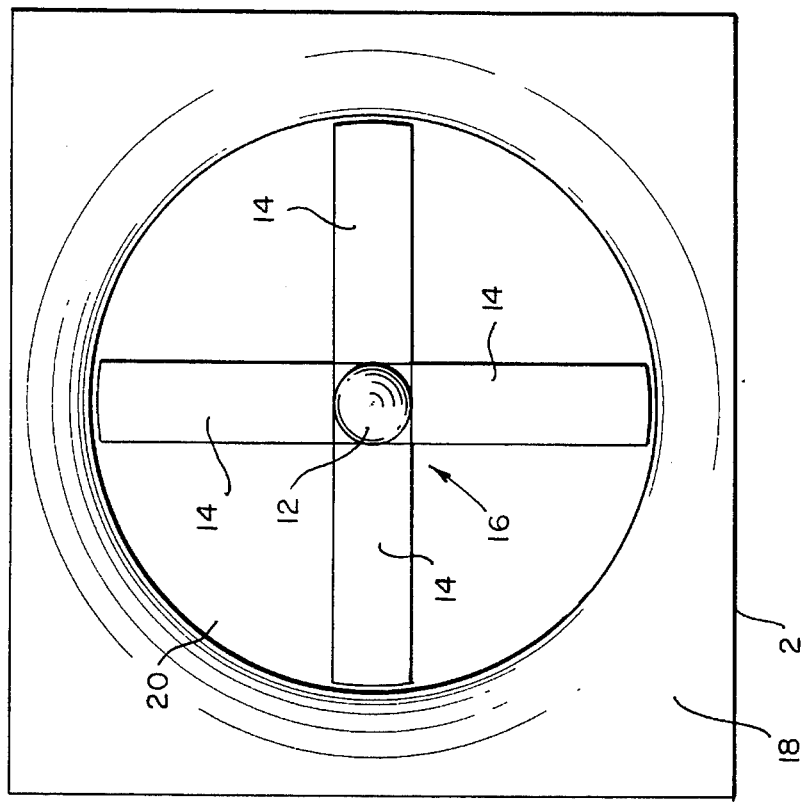
FIG. 2 is a front elevational view of the invention of FIG. 1.

The four bladed rotor shown in FIG. 2 may, alternatively, be designed with two blades in applications where the air flow velocity is very high or with six blades in applications where the air flow velocity is low.

Figure 3:
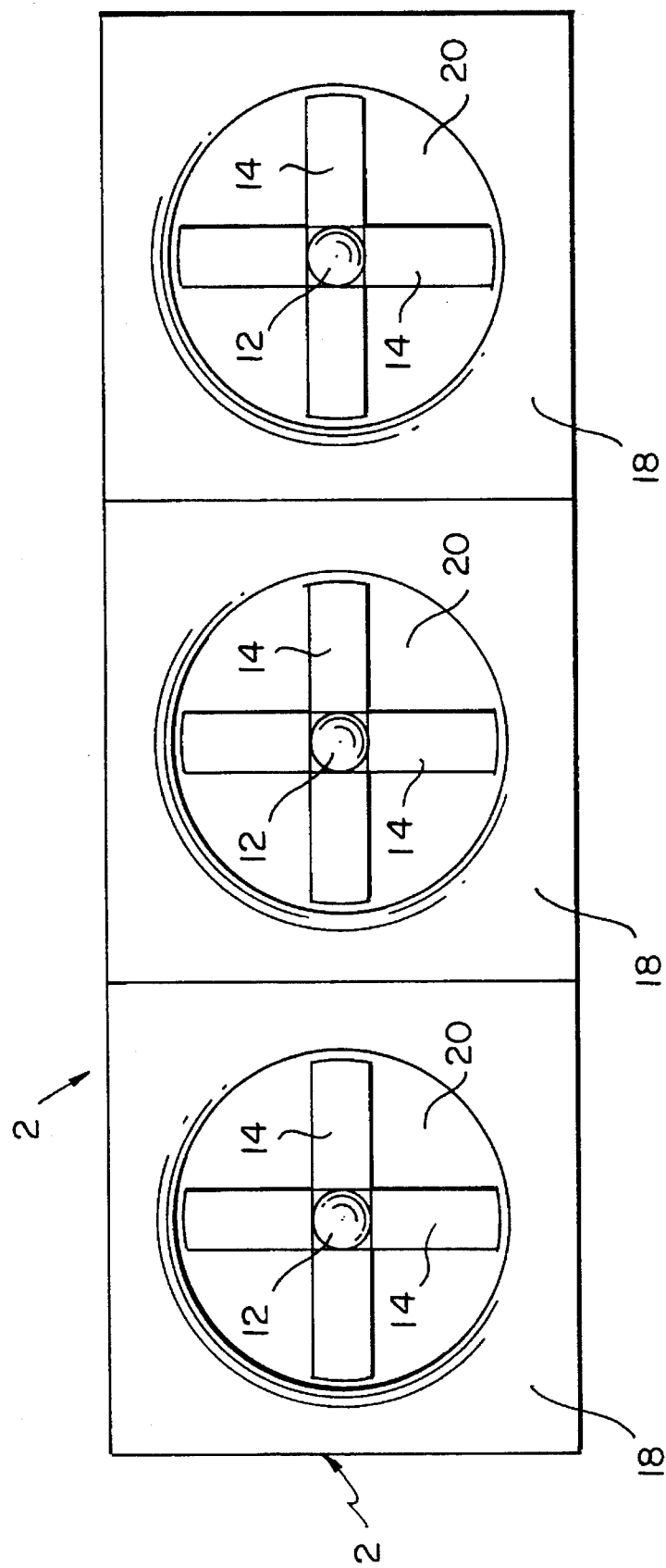
FIG. 3 is an alternate embodiment of the invention.

FIG. 3 illustrates an alternate embodiment of the present invention in which three flow directing shrouds 18 are arranged laterally horizontally. Each shroud contains a rotor assembly 16 so that air flow velocity within wide rectangular ducts can be more easily measured.

While in accordance with the provisions of the patent statute the preferred forms and embodiments have been illustrated and described, it will be apparent to those of ordinary skill in the art that various changes and modifications may be made without deviating from the inventive concept set forth above.

What is claimed is:

1. A device for measuring air flow velocity in a duct, comprising:
   (a) flow directing means mounted within the duct, said flow directing means containing a circular opening;
   (b) turbine means centrally positioned within said circular opening for responding to the air flow, said turbine means including
      (1) a rotor shaft aligned substantially parallel to the direction of air flow;
      (2) a rotor hub rigidly connected with said shaft; and
      (3) a plurality of rotor blades extending radially outward from said rotor hub;
   (c) mounting means connected within the duct for rotatably supporting said turbine means;
   (d) means connected with said turbine means for sensing the rotation thereof; and
   (e) means connected with said sensing means for indicating air flow velocity as a function of the rate of rotation of said turbine means and
wherein said flow directing means includes an outer peripheral surface contiguous with inner surface of the duct and an inner peripheral surface adjacent the outer edge of said rotor blades, whereby substantially all of the air flow through the duct is directed past said rotor blades.

2. A device as defined in claim 1, wherein said flow directing means includes an inlet portion extending upstream from said rotor blades about the inner surface of the duct and an outlet portion extending downstream from said rotor blades about the inner surface of the duct.

3. A device as defined in claim 2, wherein the inner surface of the duct and said inlet portion of said flow directing means form an angle of between 0 and 21 degrees.

4. A device as defined in claim 3, wherein the inner surface of the duct and said outlet portion of said flow directing means form an angle of between 0 and 15 degrees.

5. A device as defined in claim 1, wherein said mounting means comprises a support member including a housing for receiving said rotor shaft.

6. A device as defined in claim 1, wherein said turbine means includes two rotor blades.

7. A device as defined in claim 1, wherein said turbine means includes four rotor blades.

8. A device as defined in claim 1, wherein said turbine means includes six rotor blades.

9. A device as defined in claim 1, wherein said rotor blades have a 45° pitch angle.

10. A device as defined in claim 9, wherein said rotor blades are formed of a composite material.

11. A device as defined in claim 1, wherein said sensing means is a magnetic pickup.

12. A device as defined in claim 1, wherein said sensing means is an optical sensor.

13. A device as defined in claim 1, wherein said flow directing means contains a plurality of circular openings across the cross-sectional area of the duct, said turbine means being arranged in each opening.

* * * * *